US006380367B1

(12) United States Patent
Hinz et al.

(10) Patent No.: US 6,380,367 B1
(45) Date of Patent: Apr. 30, 2002

(54) CONTINUOUS PROCESS FOR THE PRODUCTION OF SUCROSE BASED POLYETHER POLYOLS

(75) Inventors: Werner Hinz; Edward Michael Dexheimer, both of Grosse Ile, MI (US)

(73) Assignee: BASF Corporation, Mt. Olive, NJ (US)

( * ) Notice: Subject to any disclaimer, the term of this patent is extended or adjusted under 35 U.S.C. 154(b) by 0 days.

(21) Appl. No.: 09/443,273

(22) Filed: Nov. 18, 1999

(51) Int. Cl.[7] .......................... C07H 3/04; C07H 15/08
(52) U.S. Cl. .................. 536/4.1; 536/18.3; 536/18.6; 536/120; 536/124; 422/134; 422/197
(58) Field of Search ................. 536/4.1, 18.3, 536/18.6, 120, 124; 422/134, 135, 138, 188, 197

(56) References Cited

U.S. PATENT DOCUMENTS

| 2,988,572 A | | 6/1961 | Mills et al. ................. 260/615 |
|---|---|---|---|
| 3,085,085 A | * | 4/1963 | Wismer et al. ............. 260/209 |
| 3,346,557 A | | 10/1967 | Patton et al. ............... 260/209 |
| 3,436,425 A | | 4/1969 | Stein et al. ................. 260/613 |
| 3,436,426 A | | 4/1969 | Fischer et al. ............. 260/613 |
| 3,442,888 A | | 5/1969 | Degginger et al. ......... 536/120 |
| 3,530,154 A | | 9/1970 | Stein et al. ............... 260/410.6 |
| 4,241,043 A | | 12/1980 | Hetzel ........................ 423/659 |
| 4,380,502 A | | 4/1983 | Müller et al. ............... 252/182 |
| 4,396,780 A | | 8/1983 | Shtykh et al. .............. 568/620 |
| 5,689,012 A | | 11/1997 | Pazos et al. ................. 568/619 |
| 5,811,595 A | | 9/1998 | Ellis ............................ 568/620 |
| 5,843,386 A | | 12/1998 | Makino et al. ............. 422/203 |
| 6,066,263 A | | 5/2000 | Makino et al. ............. 210/774 |

FOREIGN PATENT DOCUMENTS

| CA | 544626 | | 8/1957 |
|---|---|---|---|
| CA | 651512 | | 11/1962 |
| GB | 736991 | | 9/1955 |
| GB | 757309 | | 9/1956 |
| GB | 1470864 | * | 4/1977 |
| GB | 2 043 663 A | | 10/1980 |
| JP | H44196559 | | 1/1994 |
| WO | WO 98/40414 | * | 9/1998 |

OTHER PUBLICATIONS

Article—"Towards a Continuous Process in Heterogeneous Coordinated Anionic Ring Opening Polymerization"—Polymer Bulletin; Vo. 37, No. 3, pp. 313–320 (Jun. 7, 1996).
Process Economics Report No. 45A—"Polyols for Polyurethanes" (May 1982) PP i–xvi; 1–13; and 41–64.
PCT International Search Report Mailed Oct. 30, 2000.
Chem Abstract of DE 2903582–A2.
"37926 Continuous Polyol Process" Research Disclosure, GB, Industrial Opportunities Ltd. Havant, No. 379, Nov. 1, 1995, p. 731 XP000549192; ISSN: 0374–4353; p. 731.

* cited by examiner

Primary Examiner—James O. Wilson
Assistant Examiner—Leigh C. Maier
(74) Attorney, Agent, or Firm—Fernando Borrego; Mary K. Cameron

(57) ABSTRACT

A continuous process for the formation of sucrose based polyols is disclosed. The process comprises the steps of continuously forming an aqueous sucrose solution which is continuously combined with a catalyst and an alkylene oxide and flowed through a first spiral reaction tube. The alkylene oxide substantially completely reacting with the aqueous sucrose solution occurs to form a pre-polymer reaction product in the first spiral reaction tube. The pre-polymer reaction product is continuously flowed from the first reaction tube and unreacted water from the pre-polymer reaction product is removed. The water stripped pre-polymer reaction product is continuously flowed through a second spiral reaction tube and additional alkylene oxide is continuously added to the second spiral reaction tube. The alkylene oxide reacts with the pre-polymer reaction product in the second spiral reaction tube to form a polyol. The polyol is flowed through additional spiral reaction tubes with addition of alkylene oxide and optionally additional catalyst to each of the additional spiral reaction tubes, thus forming a polyol.

18 Claims, 3 Drawing Sheets

CONTINUOUS PROCESS FOR THE PRODUCTION OF SUCROSE BASED POLYETHER POLYOLS

BACKGROUND OF THE INVENTION

The subject invention relates to a continuous process for the formation of polyols. More specifically, the subject invention relates to a continuous process for the formation of sucrose based polyols.

Traditionally, sucrose based polyols have been difficult to form. Sucrose is not very soluble in alkylene oxide solutions, so its use as an initiator for polyol formation has been complex. In addition, sucrose based polyols have generally been formed using the well known batch process in a batch reactor. A batch reactor is a large reactor chamber that includes an agitator and a thermal jacket. The reactants are added in bulk to the reactor under pressure and the reaction proceeds for hours and sometimes days. There are many problems with batch reactors including difficulty in achieving precise control over the composition of the end product. Often the end product displays a range of size distributions. The reaction stoichiometry can be hard to control in a batch reactor. In addition, thermal control can be hard to achieve and the reaction must be run at a common temperature. Finally, the batch reactor needs to be shut down to remove the reaction product, thus slowing production. All of these problems are increased when trying to use sucrose as an initiator because of the very low solubility of sucrose in alkylene oxide solutions.

It would be advantageous to design a continuous reactor assembly to permit the continuous formation of sucrose based high quality polyols. It would be most advantageous to design the reactor assembly in a manner that promotes turbulent or pseudo-turbulent flow of the reactants and that is modular to permit rapid and easy modification of the assembly to meet the design requirements of a variety of sucrose based polyols. It would be additionally beneficial to design the reactor assembly to permit different reaction temperatures at different points in the reaction.

SUMMARY OF THE INVENTION

The present invention provides a continuous process for the formation of sucrose based polyols. The produced polyols find particular application as building blocks in the formation of rigid polyurethane foams. The process produces a very high quality polyol.

In one embodiment, the continuous process for the production of sucrose based polyols comprises the steps of continuously forming an aqueous sucrose solution. Continuously flowing the aqueous sucrose solution, a catalyst and an alkylene oxide through a first spiral reaction tube, and substantially completely reacting the alkylene oxide with the aqueous sucrose solution to form a pre-polymer reaction product in the first spiral reaction tube. Continuously flowing the pre-polymer reaction product from the first spiral reaction tube and removing unreacted water from the pre-polymer reaction product. Then, continuously flowing the pre-polymer reaction product minus the water through a second spiral reaction tube and continuously adding additional alkylene oxide to the pre-polymer reaction product, with the alkylene oxide substantially completely reacting with the pre-polymer reaction product in the second spiral reaction tube to form a polyol. In a prefered embodiment the polyol is flowed through additional spiral reaction tubes with alkylene oxide added to each spiral reaction tube to form a final sucrose based polyol having a molecular weight of between 500 to 20,000.

These and other features and advantages of this invention will become more apparent to those skilled in the art from the following detailed description of the presently preferred embodiment. The drawings that accompany the detailed description can be described as follows.

DETAILED DESCRIPTION OF A PREFERRED EMBODIMENT

Figure 1:
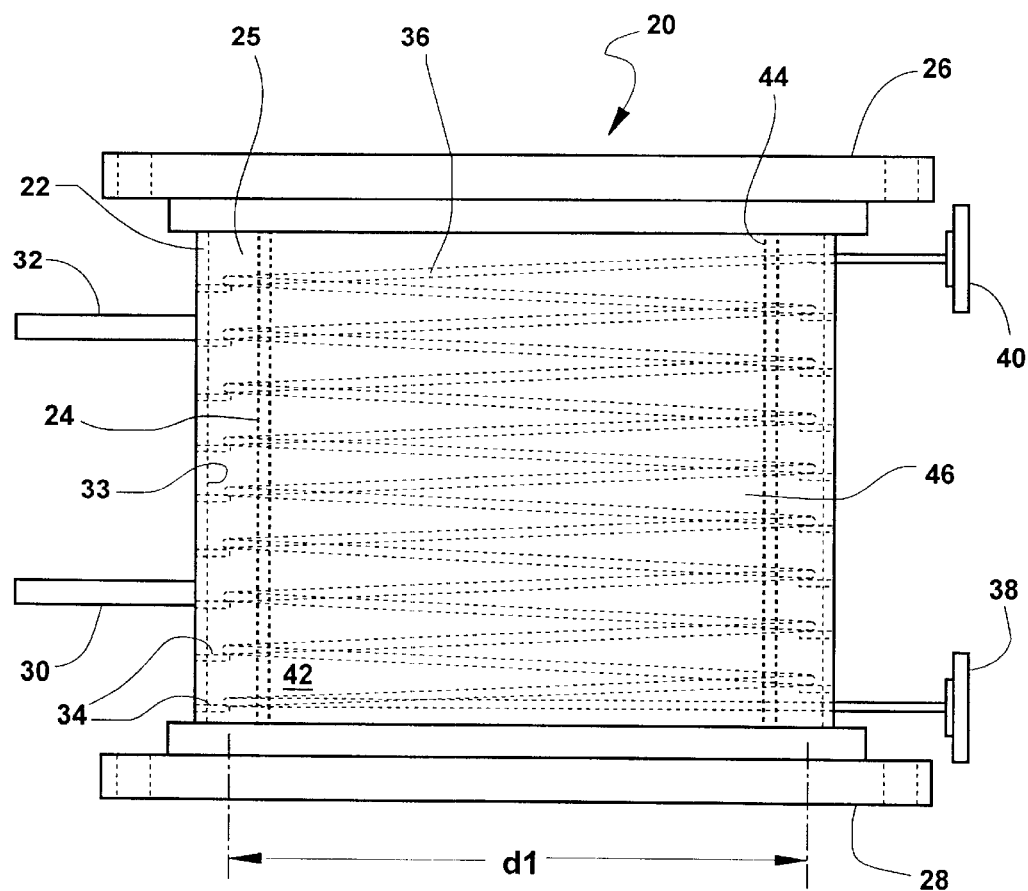
FIG. 1 is a sectional view of a reaction module.

Within the several views described below like components are given the same reference numerals.

A reactor module is generally indicated at 20 in FIG. 1. Reactor module 20 comprises an outer tube 22 with an annular chamber 25 defined by the outer tube 22. Preferably, module 20 includes and inner tube 24 with the annular chamber 25 defined between the inner tube 22 and the outer tube 24. Reactor module 20 further includes an upper flange 26 opposite a lower flange 28. A heat exchange medium inlet 30 extends through the outer tube 22 into the annular chamber 25 and a heat exchange medium outlet 32 also extends through the outer tube 22 into the annular chamber 25. In one embodiment, support rods 34 are secured to an inner wall 33 of the outer tube 22 and extend toward the inner tube 24. Alternatively, support rods 34 may be secured to inner tube 24 and extend toward outer tube 22.

A spiral reaction tube 36 is spaced apart from and spirals around the inner tube 24. Spiral reaction tube 36 rests on support rods 34 in the annular chamber 25. Spiral reaction tube 36 has a spiral diameter d1 that depends on the inner diameter of outer tube 22. The diameter d1 is selected to be 1 to 2 inches less than the inner diameter of outer tube 22. The spiral reaction tube 36 is preferably formed from stainless steel, but as is apparent to one of ordinary skill in the art, tube 36 could be formed of other materials so long as it is compatible with the desired reaction as described below. The internal diameter of the spiral reaction tube 36 can vary between about 0.25 to 3.0 inches depending on the operating parameters, as more fully described below. The length of the spiral reaction tube 36 can vary between about 20 feet to several hundred feet depending on the requirements of the reaction. The length and diameter of spiral reaction tube 36 are chosen to ensure that any reactants introduced at an inlet 38 have a sufficient residence time before the product of the reactants reaches an outlet 40. Furthermore the internal diameter and the spiral diameter d1 of the spiral reaction tube 36 are specifically designed to ensure a largely turbulent or pseudo-turbulent flow, defined as a flow with eddy current mixing off a continuously curved wall, within the reaction tube 36, which is beneficial to the polymerization reactions. This turbulent flow greatly increases the efficiency of the reaction, especially for polyol formation. As described below, the velocity of the flow rate of reactants in the spiral reaction tube 36 is also preferably chosen to provide pseudo-turbulent flow. The spiral reaction tube 36 inlet 38 and outlet 40, both extend beyond the outer tube 22. Both the inlet 38 and the outlet 40 include connectors (not shown) that permit feed lines (see FIG. 2) to be connected to each.

Figure 2:
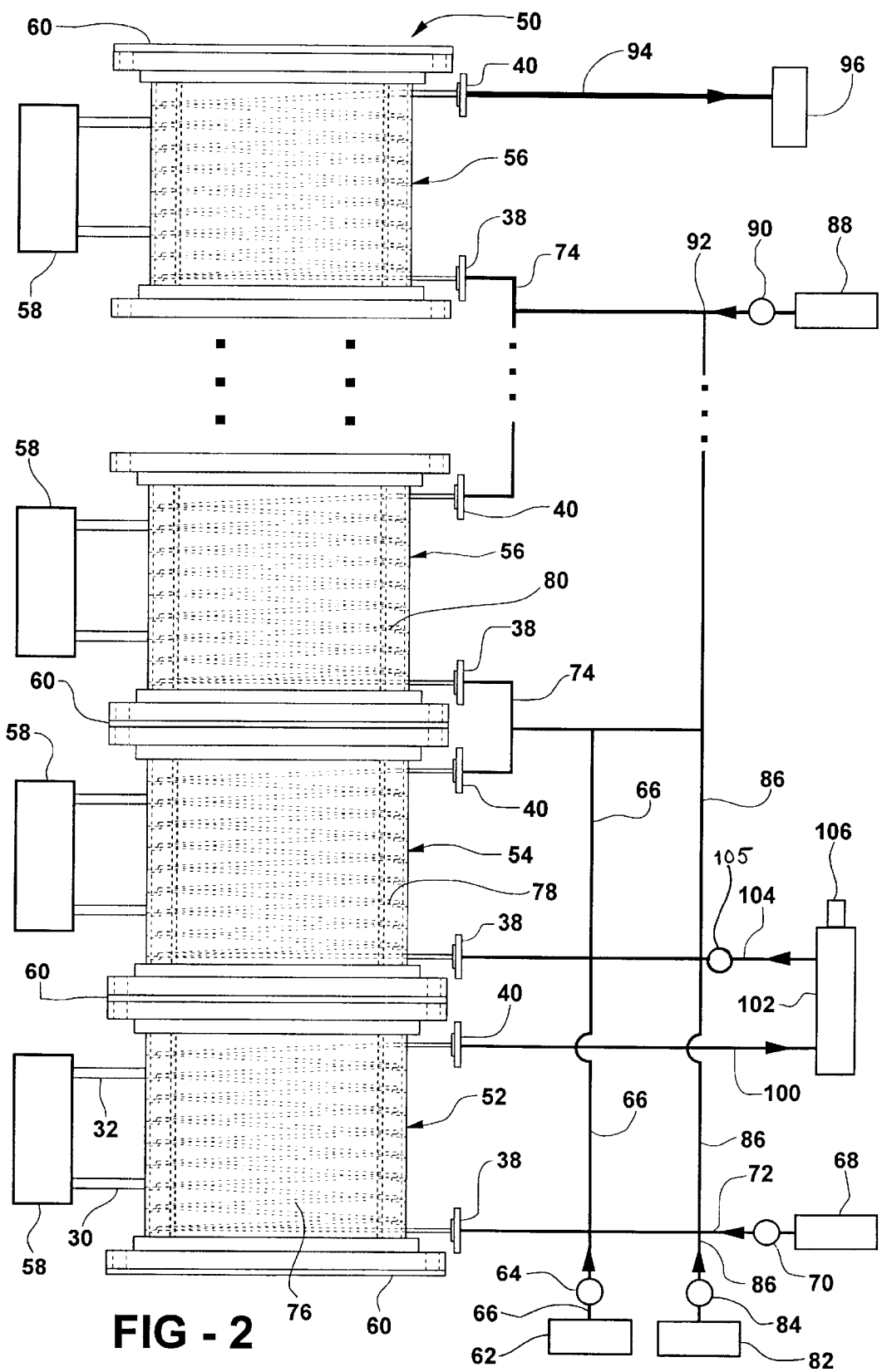
FIG. 2 is a schematic view of a continuous reactor designed in accordance with the present invention.

Adjacent the upper flange 26 and the lower flange 28 is a seal 60 (see FIG. 2) that seals the annular chamber 25 and a space 42 defined by an inner wall 44 of the inner tube 24. In one embodiment, the inner tube 24 includes perforations (not shown) that permit fluid communication between the annular chamber 25 and space 42. A heat exchange medium 46 continuously flows from heat exchange medium inlet 30 through annular chamber 25 and out of heat exchange medium outlet 32 and then recirculates through a heat exchanger 58 (FIG. 2). The heat exchange medium may be a liquid such as, for example, water, or it may be a gas. The flow of the heat exchange medium 46 is preferably turbulent within the annular chamber 25. The heat exchange medium 46 may also flow through space 42, which serves as a large heat sink to maintain a reaction temperature within the spiral reaction tube 36.

A schematic of one embodiment of a continuous reactor assembly is shown generally at 50 in FIG. 2. Continuous reactor assembly 50 comprises a series of modules 12 including a first module 52, a second module 54, and additional modules 56 stacked on top of each other and connected via fasteners (not shown) on their respective upper and lower flanges. Such fasteners are known in the art. The first module 52 includes a first spiral reaction tube 76, the second module 54 includes a second spiral reaction tube 78, and the additional modules 56 each include an additional spiral reaction tube 80. The spiral reaction tubes 76, 78, and 80 are operably connected in series via connector lines 74, a stripper line 100, and a return line 104 having a pump 105. By virtue of these connections a fluid flow is established from the inlet 38 of the first spiral reaction tube 76 through the outlet 40 of the last additional spiral reaction tube 80. Preferably the internal diameter of the first and second spiral reaction tubes 76 and 78 are about 0.75 inches. Preferably the spiral reaction tubes in subsequent modules have an internal diameter that is larger, on the order of between 1.5 to 3.0 inches. The larger diameter is necessary to accommodate the increased viscosity of the reaction product as the polyol grows and the increased volume of the reaction product while maintaining the turbulent flow characteristics.

Each module 52, 54 and 56 includes a heat exchanger 58 connected to its heat exchange medium inlet 30 and heat exchange medium outlet 32. This design permits each module 52, 54, and 56 to have a different reaction temperature if desired. For example, it is advantageous when adding propylene oxide as the alkylene oxide to have a higher reaction temperature, preferably 180° C. to 250° C., than when ethylene oxide is the alkylene oxide being added. It is also advantageous to have the first module 12a, where the aqueous sucrose is first being reacted with an alkylene oxide and a catalyst, at a lower reaction temperature of between about 80° C. and 150° C. to prevent carmelization of the aqueous sucrose. As would be understood by one of ordinary skill in the art, one or more modules could share a common heat exchanger 58.

Continuous reactor assembly 50 further includes a first alkylene oxide tank 62 that is operably connected to the inlet 38 of the first spiral reaction tube 76 through a feed line 66. A pump 64 connected to feed line 66 pressurizes the alkylene oxide in feed line 66 to a pressure above the vapor pressure of the alkylene oxide to thus maintain the alkylene oxide in a liquid state throughout the continuous reactor assembly 50. Feed line 66 also connects first alkylene oxide tank 62 to inlet 38 of a plurality of modules 12, for example modules 54 and 56.

A stock tank of aqueous sucrose 68 is operably connected to the inlet 38 of the first spiral reactor tube 76 through a feed line 72. A pump 70 connected to feed line 72 pressurizes the aqueous sucrose in feed line 72 to a pressure above the vapor pressure of the alkylene oxides used in the continuous reactor 50.

A stock catalyst tank 82 is operably connected to the inlet 38 of the first spiral reactor tube 76 through a feed line 86. A pump 84 connected to feed line 86 pressurizes the catalyst in feed line 86 to a pressure above the vapor pressure of the alkylene oxides used in the reaction. Both stock alkylene oxide tank 62 and stock catalyst tank 82 are operably connected to the inlet 38 of second spiral reaction tube 78 and additionally operably connected to additional inlets 38 of additional spiral reaction tubes 80 beyond second spiral reaction tube 78. Thus catalyst and alkylene oxide can be added to a plurality of modules 12 at multiple points in the continuous reactor assembly 50.

Optionally, another alkylene oxide tank 88 for adding a different alkylene oxide is operably connected to the inlet 38 of one or more of the additional spiral reactor tubes 80 through a feed line 92 which connects to connector line 74 joining additional spiral reaction tubes 80. A pump 90 connected to feed line 92 pressurizes the other alkylene oxide in feed line 92 to a pressure that is greater than its vapor pressure to maintain it in a liquid state. The outlet 40 of the last module 12 is operably connected through a feed line 94 to a storage tank 96. The product leaving the final module can then be further processed.

The outlet 40 of the first module 52 is operably connected via a stripping line 100 to a stripping tank 102. A vacuum source 106 is in communication with stripping tank 102. Stripping line 100 routes a pre-polymer reaction product from the outlet 40 of first module 52 to stripping tank 102. Vacuum source 106 removes unreacted water and volatile low molecular weight reaction by products such as propylene glycol or ethylene glycol from the pre-polymer reaction product after it enters stripping tank 102. A return line 104 having a pump 105 returns pre-polymer reaction product minus unreacted water to the inlet 38 of second module 54. Additionally, feed lines 66 and 86 are in communication with return line 104 and permit addition of alkylene oxide and catalyst to the water free pre-polymer reaction product as it enters second module 54. As will be understood by one of ordinary skill in the art, stripping line 100, stripping tank 102, vacuum source 106, return line 104 and pump 105 could be interposed between any two spiral reaction tubes 36, for example, as disclosed below, between a second and a third reaction tube 36.

In use of the continuous reactor 50 to produce a sucrose-based polyol, the first step is the formation of the aqueous sucrose. The aqueous sucrose is produced by combining between 50% to 70% by weight of sucrose with 50% to 30% water for a total of 100%. This combination is sufficient to solubilize the sucrose in the water. Sucrose is largely insoluble in alkylene oxide solutions. The next step is to pump the first alkylene oxide, catalyst and aqueous sucrose into the inlet 38 of the first spiral reaction tube 76. The goal is to preferably combine between 2 to 10 moles of the first alkylene oxide with each mole of sucrose in the aqueous sucrose solution. Generally, it is necessary to maintain the free alkylene oxide to a level of less than or equal to 25 weight % of the total weight of the sucrose, thus the goal may require multiple additions in multiple spiral reaction tubes 76 of the first alkylene oxide to reach a level of 2 to 10 moles of alkylene oxide added per mole of sucrose. The first spiral reaction tube 76 allows for substantially complete reaction of the alkylene oxide with the sucrose in the aqueous sucrose. It is preferable that only 3 or 4 of the 8-hydroxyl groups on sucrose are reacted with the alkylene oxide. This amount of substitution with alkylene oxide makes the modified sucrose into a liquid. The first 3 to 4 hydroxyls on the sucrose are much more reactive with alkylene oxide than is the hydroxyl in water. After 3 to 4 hydroxyls on the sucrose have reacted with the alkylene oxide, water begins to compete with the thus modified sucrose for reaction with any remaining alkylene oxide. Reaction of alkylene oxide with water produces undesirable side products such as glycols. The reaction of the alkylene oxide with the aqueous sucrose in the presence of the catalyst produces a pre-polymer reaction product.

In certain reactions it is advantageous to include a co-initiator in the aqueous sucrose solution. Preferably the co-initiator is used at a concentration sufficient to prevent crystallization of the pre-polymer reaction product. The co-initiator can also be used to alter the viscosity and functionality of the sucrose solution. One example of such a co-initiator is diethylene glycol; its use is disclosed in Examples 2 and 3 below. Other co-initiators include: glycerol; amines, such as triethanolamine; pentaerythritol; and dipropylene glycol. The co-initiators can be used in amounts of 1 to 60 mole %, based on the total number of moles of reactants in the aqueous sucrose solution.

The pre-polymer reaction product is routed from the outlet 40 of the first spiral reaction tube 76, preferably after the formation of a product having 2 to 10 moles of alkylene oxide added per mole of sucrose, through stripping line 100 to the stripping tank 102. In stripping tank 102 the pre-polymer reaction product is subjected to a vacuum as is known in the art. The vacuum removes unreacted water from the reaction product. Surprisingly, the continuous reactor 50 is so efficient at reacting alkylene oxide with the aqueous sucrose that approximately 95% of the water initially in the aqueous sucrose is recovered and removed from the pre-polymer reaction product in stripping tank 102. The water stripped pre-polymer reaction product is then routed via return line 104 and pump 105 to the inlet 38 of the second module 54. Alkylene oxide feed line 66 and catalyst feed line 86 are connected to return line 104, thus additional catalyst and alkylene oxide can be added to the second spiral reaction tube 78 of the second module 54. As is known in the art, it may not be necessary to add additional catalyst, but it is generally necessary to add additional alkylene oxide.

As the growing polyol flows through the continuous reactor 50 additional alkylene oxide is added to the product of each module 12 prior to entry into the next module 12. Thus the polyol grows in each module 12. As will be understood by one of ordinary skill in the art the continuous reactor 50 is a flexible design that permits the formation of virtually any polyol composition because at each module 12 a different or the same alkylene oxide can be added to the growing polyol. Thus, one can form block, heteric and random sequences of desired alkylene oxides. The size of each spiral reaction tube 20 preferably permits essentially complete reaction between the added alkylene oxide and the growing polyol in each module 12. The continuous reactor 50 can be used to produce sucrose-based polyols with an average molecular weight between about 500 and 20,000.

Figure 3:
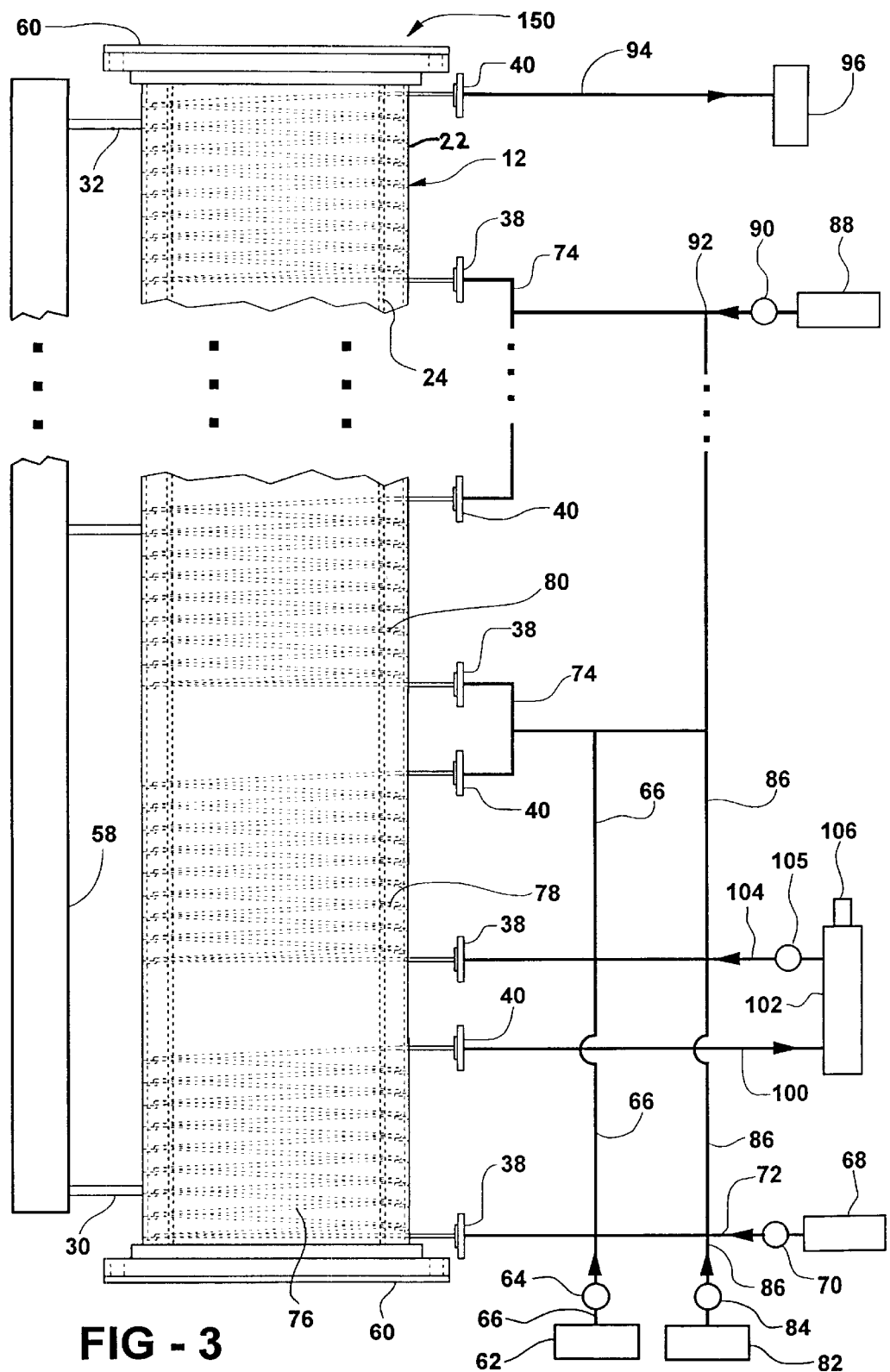
FIG. 3 is an alternative embodiment of a continuous reactor.

In FIG. 3 an alternative embodiment of a continuous reactor is shown generally at 150. Continuous reactor 150 is very similar to reactor 50 with the exception that reactor 150 is formed as a single module 12 having a plurality of spiral reaction tubes 76, 78, and 80 mounted in the module 12. In addition, reactor 150 includes a single heat exchanger 58 having an inlet 30 and outlet 32 to provide a single reaction temperature in the module 12. Reactor 150 functions essentially the same as reactor 50.

The useful alkylene oxides for the disclosed process include ethylene oxide, propylene oxide, butylene oxide and other known alkylene oxides.

The useful catalysts include: the alkaline catalysts, such as, for example, potassium hydroxide, sodium hydroxide, alcoholates of potassium hydroxide, alcoholates of sodium hydroxide, cesium hydroxide, or amines; Lewis acid catalysts such as boron trifluoride; and metal complex catalysts such as double metal cyanide complexes. Potassium hydroxide is the preferred catalyst. The catalysts are preferably used at concentrations of 0.1 to 1.0%.

EXAMPLE 1

A continuous reactor similar to that disclosed in FIG. 2 was used except that in this reactor the stripping tank 102 was between the second and third modules. Each module included a spiral reaction tube of 300' in length providing a residence time of approximately 10 minutes. The heat exchange medium was "Therminol® (Monsanto)". An aqueous sucrose solution was prepared by combining 1800 grams of sucrose in 1200 grams of water. The aqueous sucrose solution further contained 0.4% KOH 100% as the catalyst. The resulting sucrose concentration was 60%. An ethylene oxide and propylene oxide monomer mixture was prepared by combining 40% ethylene oxide with 60% propylene oxide (w/w). The aqueous sucrose solution was injected together with the monomer mixture into a first spiral reaction tube. The feed ratio of aqueous sucrose solution to monomer mixture was 11.4:5.8 (w/w). The reactants were fed into the module containing the first spiral reaction tube at a pressure of approximately 530 lbs. per square inch. The heat transfer medium was at a temperature of 140° C. in the first module. After passing through the first module the reaction mixture was passed into a second spiral reaction tube wherein the heat exchange medium was at a temperature of 180° C. After passage through the second spiral reaction tube the product was removed to a stripping tank and placed under high vacuum to remove the remaining water and low molecular weight volatile by-products. The product obtained had a hydroxyl number of 827 and a viscosity of 16,800 centipoise at 120° F. The calculated functionality of the product was 5.2 and approximately 95% of the water in the aqueous sucrose solution was removed as unreacted from the product.

EXAMPLE 2

Using a continuous reactor similar to that utilized in Example 1, a 60% aqueous sucrose solution was produced by combining 1800 grams of sucrose in 1200 grams of water, containing 0.4% KOH 100% as the catalyst and 100 grams of diethylene glycol as a co-initiator. An ethylene oxide and propylene oxide monomer mixture was prepared by combining 20% ethylene oxide with 80% propylene oxide (w/w). The aqueous sucrose solution and ethylene oxide/propylene oxide monomer mixture were injected into an inlet of the first spiral reaction tube in a first module at a pressure of approximately 500 lbs. per square inch. The feed ratio of aqueous sucrose solution to monomer mixture was 11.3:5.7 (w/w). The heat exchange medium was at a temperature of 140° C. After passing through the first module the reaction mixture was passed through a second module with a second spiral reaction tube wherein the heat exchange medium was at a temperature of 180° C. The product from the second spiral reaction tube was placed under high vacuum and the remaining water and low molecular weight of volatile by-products were removed. The intermediate produced at this point had a hydroxyl number of 863 and a viscosity of approximately 20,350 centipoise at 120° F. Its calculated functionality was 5.0 and approximately 93% of the water in the aqueous sucrose solution was removed as unreacted. The intermediate was subsequently injected together with additional ethylene oxide/propylene oxide monomer mixture into a third spiral reaction tube at a feed ratio of intermediate to additional monomer mixture of 8.2:8.8 (w/w). The pressure upon entry into the third spiral reaction tube was approximately 580 lbs. per square inch. The heat exchange medium in the third module was set to 140° C. The reaction product was passed from the third spiral reaction tube into a fourth spiral reaction tube wherein the heat exchange medium was at a temperature of 180° C. Following passage through the fourth spiral reaction tube, the product was placed under high vacuum to remove unreacted alkaline oxide monomer. The obtained product had a hydroxyl number of 425 and a viscosity of 5,100 centipoise at 80° F. The calculated functionality of the reaction product was 5.0.

EXAMPLE 3

Using a continuous reactor similar to that described in Example 1, an aqueous sucrose solution was prepared by combining 1800 grams of sucrose in 1200 grams of water, containing 0.4% KOH 100% as the catalyst and 100 grams of diethylene glycol as the co-initiator. The aqueous sucrose solution had a sucrose concentration of 60%. An ethylene oxide and propylene oxide monomer mixture was prepared by combining 20% ethylene oxide with 80% propylene oxide (w/w). The aqueous sucrose solution and monomer mixture was injected into a first spiral reaction tube at a feed ratio of sucrose to monomer of 11.3:5.7 (w/w). The entry pressure was approximately 500 lbs. per square inch. The heat exchange medium was set to a temperature of 140° C. The product from the first spiral reaction tube was passed through a second spiral reaction tube wherein the heat exchange medium was at a temperature of 180° C. The reaction product from the second spiral reaction tube was placed under high vacuum to remove unreacted water and low molecular weight glycols. The intermediate produced at this point had a hydroxyl number of 863 and a viscosity of 20,350 centipoise at 120° F. The calculated functionality was 5.0 and approximately 94% of the water in the aqueous sucrose solution was removed as unreacted. The reaction product was then passed through a third spiral reaction tube wherein additional ethylene oxide/propylene oxide monomer was added at a feed ratio of reaction product to additional monomer of 9.3:8.3 (w/w). The entry pressure into the third spiral reaction tube was 630 lbs. per square inch and the heat exchange medium was set to a temperature of 140° C. The reaction product from the third spiral reaction tube was fed into a fourth spiral reaction tube wherein the heat exchange medium was set at a temperature of 180° C. The reaction product from the fourth spiral reaction tube was placed under high vacuum to remove unreacted alkaline oxide monomer. The obtained product had a hydroxyl number of 469 and a viscosity of 8,400 centipoise at 80° F. Its calculated functionality was 5.0.

The present invention has been described in accordance with the relevant legal standards, thus the foregoing description is exemplary rather than limiting in nature. Variations and modifications to the disclosed embodiment may become apparent to those skilled in the art and do come within the scope of this invention. Accordingly, the scope of legal production afforded this invention can only be determined by studying the following claims.

We claim:

1. A continuous process for the production of sucrose based polyols, said continuous process comprising the steps of:

a) forming an aqueous sucrose solution;

b) continuously flowing said aqueous sucrose solution, a catalyst and an alkylene oxide through a first spiral shaped reaction tube in a turbulent flow, said alkylene oxide substantially completely reacting with said aqueous sucrose solution to form a pre-polymer reaction product having from 2 to 10 moles of alkylene oxide added to each mole of sucrose in said first spiral shaped reaction tube;

c) continuously flowing said pre-polymer reaction product from said first reaction tube and removing unreacted water from said pre-polymer reaction product; and d) continuously flowing said pre-polymer reaction product from step c) through a second spiral shaped reaction tube in a turbulent flow and continuously adding additional alkylene oxide to said second spiral shaped reaction tube, said alkylene oxide substantially completely reacting with said pre-polymer reaction product from step c) in said second spiral shaped reaction tube to form a polyol, wherein said alkylene oxide in said first and said second spiral shaped reaction tubes are pressurized at a pressure that is sufficiently above the vapor pressure of the alkylene oxide to maintain the alkylene oxide in a liquid state in said first and said second spiral shaped reaction tubes.

2. A continuous process as recited in claim 1 wherein step a) comprises continuously forming an aqueous sucrose solution of between about 50% to 80% by weight of sucrose and 50% to 20% by weight of water, both based on the total weight of said sucrose solution.

3. A continuous process as recited in claim 1 wherein step c) comprises removing at least 90% of the amount of the water initially present in the aqueous sucrose solution.

4. A continuous process as recited in claim 1 wherein step d) comprises adding an alkylene oxide to said second spiral shaped reaction tube that is not the same as the alkylene oxide added in step b).

5. A continuous process as recited in claim 1 comprising the further steps of surrounding said first and said second spiral shaped reaction tubes with a heat exchange medium and continuously flowing said heat exchange medium around said first and said second spiral shaped reaction tubes, said heat exchange medium establishing and maintaining a reaction temperature in said first and said second spiral shaped reaction tubes between about 90° C. and 250° C.

6. A continuous process as recited in claim 1 wherein at least one of step b) and step d) comprises adding ethylene oxide or propylene oxide.

7. A continuous process as recited in claim 1 wherein step d) further comprises adding additional catalyst to said second spiral shaped reaction tube.

8. A continuous process as recited in claim 1 wherein step b) comprises adding as said catalyst potassium hydroxide, sodium hydroxide, an alcoholate of potassium hydroxide, an alcoholate of sodium hydroxide, cesium hydroxide, an amine, a Lewis acid catalyst, or a metal complex catalyst.

9. A continuous process as recited in claim 1 comprising the further steps of:

continuously flowing said polyol from step d) through a plurality of additional spiral shaped reaction tubes in a turbulent flow operably connected to said second spiral shaped reaction tube and each other in series; and adding to a plurality of said additional spiral shaped reaction tubes additional alkylene oxide.

10. A continuous process as recited in claim 9 comprising the further step of adding to at least one of said plurality of additional spiral shaped reaction tubes additional catalyst.

11. A continuous process as recited in claim 9 comprising the further step of flowing said polyol from step d) through a sufficient number of additional spiral shaped reaction tubes and adding sufficient additional alkylene oxide to form a polyol having an average molecular weight of between about 500 to 20,000.

12. A continuous process for the production of sucrose based polyols, said process comprising the steps of:
   a) forming an aqueous sucrose solution by combining between 50% to 80% by weight of sucrose with between 50% to 20% by weight of water, based on the total weight of said sucrose solution;
   b) continuously flowing said aqueous sucrose solution, a catalyst and an alkylene oxide through a first spiral shaped reaction tube in a turbulent flow, said alkylene oxide substantially completely reacting with said aqueous sucrose solution to form a pre-polymer reaction product having from 2 to 10 moles of alkylene oxide added to each mole of sucrose in said first spiral shaped reaction tube;
   c) continuously flowing said pre-polymer reaction product from said first reaction tube and removing unreacted water from said pre-polymer reaction product;
   d) continuously flowing said pre-polymer reaction product from step c) through a second spiral shaped reaction tube in a turbulent flow and continuously adding additional alkylene oxide to said second spiral shaped reaction tube said alkylene oxide substantially completely reacting with said pre-polymer reaction product from step c) in said second spiral reaction tube to form a polyol; and
   e) surrounding said first and said second spiral shaped reaction tubes with a heat exchange medium and continuously flowing said heat exchange medium around said first and said second spiral shaped reaction tubes, said heat exchange medium establishing and maintaining a reaction temperature in said first and said second spiral shaped reaction tubes between about 90° C. and 250° C. and wherein said alkylene oxide in said first and said second spiral shaped reaction tubes are pressurized at a pressure that is sufficiently above the vapor pressure of the alkylene oxide to maintain the alkylene oxide in a liquid state in said first and said second spiral shaped reaction tubes.

13. A continuous process as recited in claim 12 wherein step c) comprises removing at least 90% of the amount of the water present in the aqueous sucrose solution.

14. A continuous process as recited in claim 12 wherein step d) comprises adding an alkylene oxide to said second spiral shaped reaction tube that is not the same as the alkylene oxide added in step b).

15. A continuous process as recited in claim 12 wherein at least one of step b) and step d) comprises adding ethylene oxide or propylene oxide.

16. A continuous process as recited in claim 12 wherein step d) further comprises adding additional catalyst to said second spiral shaped reaction tube.

17. A continuous process as recited in claim 12 wherein step b) comprises adding as said catalyst potassium hydroxide, sodium hydroxide, an alcoholate of potassium hydroxide, an alcoholate of sodium hydroxide, cesium hydroxide, an amine, a Lewis acid catalyst, or a metal complex catalyst.

18. A continuous process as recited in claim 12 comprising the further steps of:
   continuously flowing said polyol from step d) through a plurality of additional spiral shaped reaction tubes in a turbulent flow operably connected to said second spiral shaped reaction tube and each other in series;
   adding to each of said plurality of spiral shaped reaction tubes additional alkylene oxide and adding to at least one of said plurality of additional spiral shaped reaction tubes additional catalyst.

* * * * *